United States Patent

Moteki et al.

[11] Patent Number: 6,102,571
[45] Date of Patent: Aug. 15, 2000

[54] PACKAGING BAG

[75] Inventors: Yoshiji Moteki; Shigeyuki Oshima, both of Tokyo-to, Japan

[73] Assignee: Hosokawa Yoko Co., Ltd., Japan

[21] Appl. No.: 09/301,549

[22] Filed: Apr. 29, 1999

[30] Foreign Application Priority Data

Sep. 30, 1998 [JP] Japan ................................. 10-278113

[51] Int. Cl.$^7$ ................................................. B65D 33/00
[52] U.S. Cl. ........................ 383/208; 383/109; 383/201; 383/209
[58] Field of Search .................... 383/201, 207, 383/208, 209, 109

[56] References Cited

U.S. PATENT DOCUMENTS

| | | | |
|---|---|---|---|
| 3,608,815 | 9/1971 | Bunch | 383/201 |
| 4,834,245 | 5/1989 | Ohga et al. | 383/201 |
| 4,903,841 | 2/1990 | Ohsima et al. | 383/201 X |

FOREIGN PATENT DOCUMENTS

| | | | |
|---|---|---|---|
| 596747 | 5/1994 | European Pat. Off. | 383/208 |
| 153459 | 6/1989 | Japan | 383/209 |

*Primary Examiner*—Jes F. Pascua
*Attorney, Agent, or Firm*—Parkhurst & Wendel, L.L.P.

[57] ABSTRACT

A packaging bag comprises a tubular body obtained by joining opposite ends of a strip film comprising a lamination of oriented and non-oriented films to each other so as to form a longitudinal sealed portion. The tubular body has at opposite sides in its diametrical direction crease portions, respectively, and has at opposite edges in its longitudinal direction lateral sealed portions, respectively. The crease portion has the first tearable zone, which can be torn at longitudinal different positions. The longitudinal sealed portion is located on the back surface side of the bag and has the second tearable zone, which can be torn at longitudinal different positions. The second tearable zone has a length identical with or longer than that of the first tearable zone. The upper edge of the second tearable zone is located in the same level as or above the upper edge of the first tearable zone and the lower edge of the former is located in the same level as or below the lower edge of the latter.

8 Claims, 4 Drawing Sheets

PACKAGING BAG

BACKGROUND OF THE INVENTION

1. Field of the Invention

The present invention relates to a packaging bag, which is formed in the shape of pillow or envelope and is provided at its crease portion on the side of the packaging bag with a plurality of tearable portions through which the packaging bag can be opened.

2. Description of the Related Art

As a packaging bag for receiving oily food such as fried pastry, there has recently been used a packaging bag formed in the shape of pillow or envelope. The packaging bag has on its bask surface side a heat sealed portion formed by heat-sealing the opposite ends of a strip film. The packaging bag is filled with an inert gas such as nitrogen gas in the light of prevention of oxidation of contents received in the packaging bag. Such a packaging bag is required to have a high sealing strength, for example, a sealing strength of 3.5 kg/15 mm width (i.e., the sealed portion having a width of 15 mm can resist a peeling force of 3.5 kg) in order to ensure a high gas-barrier property.

However, with such a high sealing strength, a strong force is required to unseal the packaging bag, thus making it impossible to carry out a smooth opening. Accordingly, there has been proposed to reduce the sealing strength to 1.2 kg/15 mm width. It is however hard to adjust properly the sealing strength upon manufacturing of the packaging bag with the result that the packaging bag having the desired sealing strength cannot be manufactured in a reliable manner.

In view of the fact that the smooth opening cannot be carried out in the above-described packaging bag having the heat-sealed portions, there has been proposed a packaging bag having on its upper and lower sealed portions zigzag notches, respectively. The zigzag notches serve as tearable portions from which the packaging bag can be torn to open the same. However, the sealed portions of such a kind of packaging bag have a relatively large thickness, and it is not easy to tear them even when the zigzag notches are formed thereon. Moreover, the packaging bag is torn in its longitudinal direction, and the contents received therein tend to be scattered when tearing the packaging bag.

In addition, in case that the packaging bag receives oily food such as fried pastry, decrease in an amount of the contents requires fingers to be stuck deeply into the packaging bag to pick the contents therefrom. As a result, oil adheres not only to the fingers, but also to the palm and back of the hand, thus giving a person an unpleasant feeling.

SUMMARY OF THE INVENTION

An object of the present invention is therefore to provide a packaging bag, which has an excellent gas-barrier property and permits to be smoothly opened, and makes it possible to pick easily the contents received in the packaging bag without sticking a hand deeply therein, when an amount of the contents is decreased, thus preventing the hand from becoming unclean.

In order to attain the aforementioned object, the packaging bag of the present invention comprises a tubular body obtained by joining opposite ends of a strip film comprising a lamination of at least one oriented film and at least one non-oriented film to each other so as to form a longitudinal sealed portion, said tubular body having at opposite sides in a diametrical direction thereof crease portions, respectively, and said tubular body having at opposite edges in a longitudinal direction thereof lateral sealed portions, respectively, wherein:

at least one of said crease portions has a first tearable zone in which said oriented film has perforations, which are covered with said non-oriented film, said first tearable zone being capable of being torn at longitudinal different positions;

said longitudinal sealed portion is located on a back surface side of said packaging bag and has a second tearable zone in which said oriented film has perforations, which are covered with said non-oriented film, said second tearable zone being capable of being torn at longitudinal different positions;

said second tearable zone has a length in a longitudinal direction of said packaging bag, which is identical with or longer than that of said first tearable zone; and an upper edge of said second tearable zone is located in a same level as or above an upper edge of said first tearable zone and a lower edge of said second tearable zone is located in a same level as or below a lower edge of said first tearable zone.

According to the above-mentioned structure that each of the first and second tearable zones, the oriented film has perforations, which are covered with the non-oriented film, excellent properties such as steam penetration resistant property and gas-barrier property can be ensured. In addition, the packaging bag can be torn in a lateral direction thereof at different positions in the vertical (i.e., longitudinal) direction thereof. It is therefore possible to cut away a portion becoming useless from the packaging bag when an amount of the contents received therein is decreased, with the result that it is unnecessary to stick a hand deeply into the packaging bag to pick the contents therefrom. Since the first and second tearable zones are formed on at least one of the opposite crease portions of the packaging bag and the longitudinal sealed portion located on the back surface side thereof, the tearing action for opening the packaging bag can be carried out smoothly and is not obstructed by the above-mentioned longitudinal sealed portion.

According to the feature that the second tearable zone has a length in the longitudinal direction of the packaging bag, which is identical with or longer than that of the first tearable zone, even when the tearing line curves upon opening the packaging bag, it can pass through the second tearable zone formed on the back surface side of the packaging bag.

DETAILED DESCRIPTION OF THE PREFERRED EMBODIMENTS

Now, embodiments of a packaging bag of the present invention will be described in detail below with reference to the accompanying drawings.

Figure 1:
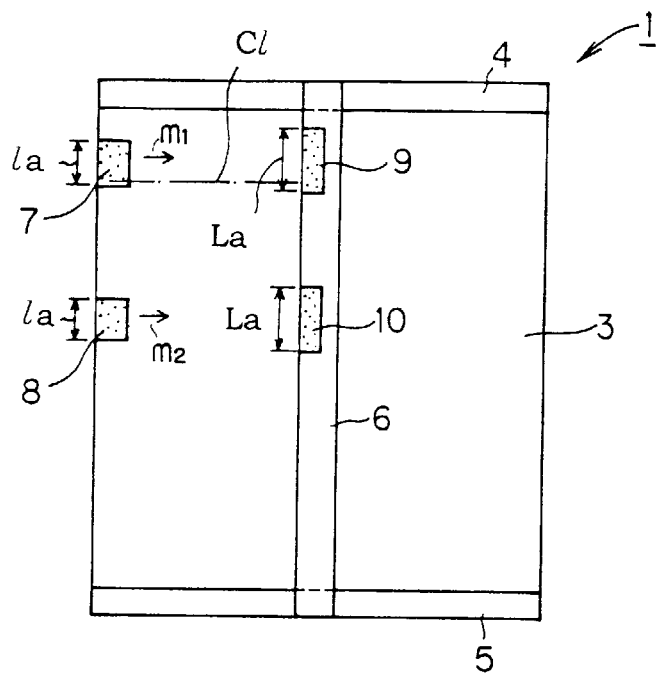
FIG. 1 is a back view illustrating a packaging bag of an embodiment of the present invention.
Figure 2:
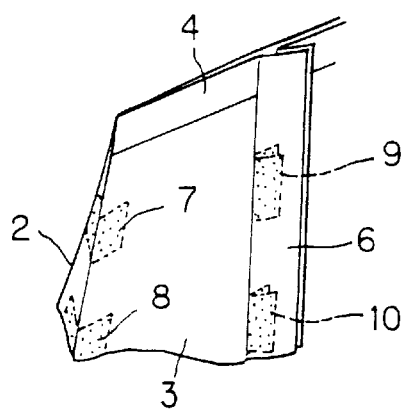
FIG. 2 is a perspective view illustrating the upper portion of the packaging bag of the present invention.

As shown in FIGS. 1 and 2, a packaging bag 1 of the present invention has a front surface 2 and a back surface 3 and is composed of a tubular body. The tubular body is obtained by joining the opposite ends of a strip film to each other through a heat sealing method so as to form a longitudinal sealed portion 6. The tubular body has at the opposite sides in the diametrical direction thereof crease portions so that the longitudinal sealed portion 6 is located on the back surface 3 of the packaging bag 1. The formation of the packaging bag 1 is completed by heat-sealing the opposite edges in the longitudinal direction thereof, i.e., the upper and lower edges so as to form lateral sealed portions 4, 5, respectively. Such a kind of packaging bag, which is provided on its back surface with the longitudinal sealed portion 6 is in general called the "pillow-type packaging bag". One of the side edges (i.e., the crease portions) of the packaging bag 1, there is formed the first tearable zone, which includes first tearable rough surface portions 7, 8 spaced apart from each other in the longitudinal (vertical) direction of the packaging bag 1.

The packaging bag 1 has on its back surface 3 marks of an arrow m1, m2 printed thereon in the vicinity of the first tearable rough surface portions 7, 8. The marks m1, m2 indicate the tearing position and direction for a user. More specifically, when the packaging bag 1 filled with contents and gas is initially opened, the first tearable rough surface portion 7, which is located at the upper portion of the packaging bag 1 and has the mark m1, is torn in the horizontal direction (i.e., in the lateral direction) of the packaging bag 1 to open the packaging bag 1 so that the contents can be picked therefrom. After picking a certain amount of the contents from the packaging bag 1 so that the level of the contents reaches the vicinity of the bottom of the packaging bag 1, the other first tearable rough surface portion 8, which is located at the middle portion of the packaging bag 1 and has the mark m2 is torn in the horizontal direction of the packaging bag 1 so as to cut away a torn portion becoming useless from the packaging bag 1. The depth of the packaging bag 1 becomes smaller so as to permit the remaining contents to be picked easily from the packaging bag 1. Even when the packaging bag 1 receives oily food such as fried pastry as the contents, it is possible to prevent a hand from becoming unclean with oil adhered on the inner surface of the packaging bag 1. In the vicinity of the mark m1, there may be added an indication "Please open here", and in the vicinity of the mark m2, there may be added an indication "It can also be opened here".

Figure 3:
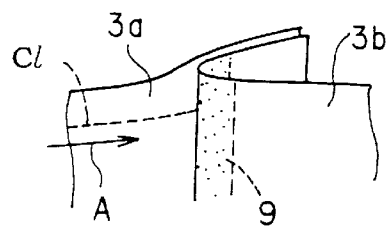
FIG. 3 is a descriptive view illustrating a longitudinal sealed portion of the packaging bag of the present invention.
Figure 4:
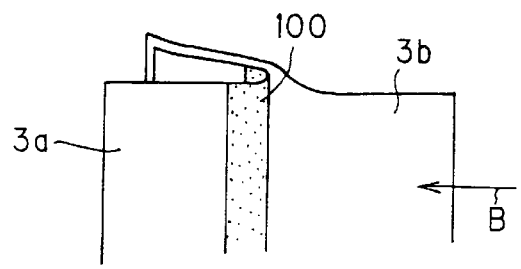
FIG. 4 is a descriptive view illustrating a modification of the longitudinal sealed portion of the packaging bag of the present invention.

On the longitudinal sealed portion 6 located on the central portion of the back surface 3 of the packaging bag 1, there is also formed the second tearable zone, which includes second tearable rough surface portions 9, 10 corresponding to the first tearable rough surface portions 7, 8 formed on the side edge (i.e., the crease portion) of the packaging bag 1, respectively. As shown in FIG. 3, the second tearable rough surface portions 9, 10 are formed on a folded portion of the longitudinal sealed portion 6, which has the longitudinal edge opposing against the tearing direction A in the first tearable rough surface portions 7, 8. More specifically, the second tearable rough surface portions 9, 10 are provided on the folded portion for forming the longitudinal sealed portion 6, which is formed in the right-hand sheet portion 3$b$ of the packaging bag 1, so that the cutting line c1 to be formed on the left-hand sheet portion 3$a$ from the first tearable rough surface portion 7 to extend horizontally can cross the second tearable rough surface portion 9 and the other cutting line (not shown) to be formed on the left-hand sheet portion 3$a$ from the first tearable rough surface portion 8 to extend horizontally can cross the second tearable rough surface portion 10. Such a structure causes a smooth tearing action to be carried out. When the packaging bag 1 is designed so as to permit to carry out the tearing action in the tearing direction B as shown in FIG. 4 from the right-hand sheet portion 3$b$, the second tearable rough surface portions are formed on a folded portion 100 of the left-hand sheet portion 3$a$, which forms the longitudinal sealed portion.

Figure 5:
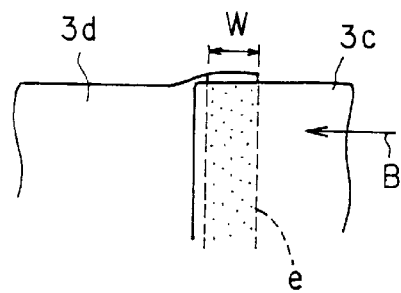
FIG. 5 is a descriptive view illustrating another modification of the longitudinal sealed portion of the packaging bag of the present invention.

The second tearable surface portions 9, 10 are formed on the folded portion for forming the longitudinal sealed portion 6 in which the longitudinal outer surface of the one edge of the strip film and the longitudinal outer surface of the other edge thereof are brought into contact to each other to join them with each other so as to form the pillow-type packaging bag. The present invention is not limited to such a structure, and it can be applied to an envelope-type packaging bag, which has the longitudinal sealed portion in which the longitudinal outer surface of the one edge of the strip film and the longitudinal inner surface of the other edge thereof are brought into contact to each other to join them with each other. In this case, the second tearable rough surface portions are formed on the connecting portion "e" of the one edge of the strip film in the direction perpendicular to the tearing direction B by a prescribed width "W" as shown in FIG. 5.

The tearing line Cl as shown in FIG. 1 may curve upward or downward upon opening the packaging bag 1. Accordingly each of the second tearable rough surface portions 9, 10 located on the longitudinal sealed portion 6 on the back surface 3 of the packaging bag 1 has a length La in the longitudinal direction thereof, which is identical with or longer than the length la of each of the first tearable rough surface portions 7, 8. In addition, the upper edge of each of the second tearable rough surface portions 9, 10 is located in the same level as or above the upper edge of the corresponding one of the first tearable rough surface portions 7, 8 and the lower edge of each of the second tearable rough surface portions 9, 10 is located in the same level as or below the lower edge of the corresponding one of the first tearable rough surface portions 7, 8. Even when the tearing line Cl curves, it securely passes through the second tearable rough surface portion 9 (10) located on the longitudinal sealed portion of the back surface 3 of the packaging bag 1, thus permitting to carry out the smooth tearing action.

Figure 6:
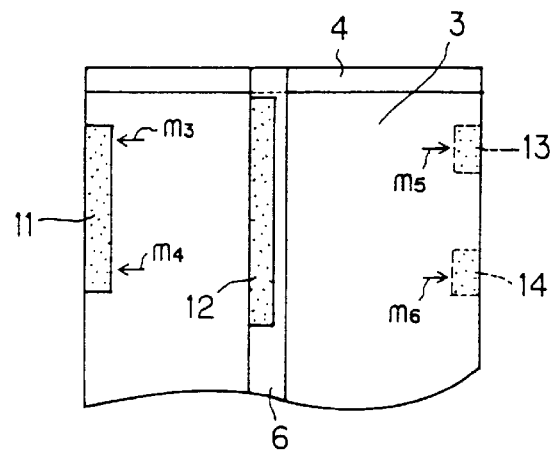
FIG. 6 is a back view illustrating modifications of the first and second tearable zones of the packaging bag of the present invention.

As shown in FIG. 6, the first tearable rough surface portions on the side edge (i.e., the crease portion) of the packaging bag 1 may be formed as the single tearable rough surface portion 11 having a prescribed length, and the second tearable rough surface portions on the longitudinal sealed portion of the back surface of the packaging bag 1 may be formed as the single tearable rough surface portion 12. In this case, the marks m3, m4 indicating the tearing position for a user are printed so as to be spaced apart from each other on the back surface 3 of the packaging bag 1 in the vicinity of the upper and lower edges of the first tearable rough surface portion 11. The second tearable rough surface portion 12 located on the longitudinal sealed portion 6 on the back surface 3 of the packaging bag 1 has a length in the longitudinal direction thereof, which is identical with or longer than that of the first tearable rough surface portion 11. In addition, the upper edge of the second tearable rough surface portion 12 is located in the same level as or above the upper edge of the first tearable rough surface portion 11 and the lower edge of the second tearable rough surface portion 12 is located in the same level as or below the lower edge of the first tearable rough surface portion 11.

Incidentally, the first tearable rough surface portions separated into the upper and lower portions as shown in FIG. 1 may be provided on the left-hand side edge of the packaging bag, and the second tearable rough surface portion formed as the single portion extending vertically as shown in FIG. 6 may be provided on the longitudinal sealed portion of the back surface of the packaging bag. Further, the first tearable rough surface portion formed as the single portion extending vertically as shown in FIG. 6 may be provided on the left-hand side edge of the packaging bag, the second tearable rough surface portion formed as the single portion extending vertically as shown in FIG. 6 may be provided on the longitudinal sealed portion of the back surface of the packaging bag, and the other first tearable rough surface portions separated into the upper and lower portions, which are the same as shown in FIG. 1 may be provided on the right-hand side edge of the packaging bag. In this case, the second tearable rough surface portion may be formed into the upper and lower portions as shown in FIG. 1. The first and second tearable rough surface portions described above may be combined with each other in any manner.

Figure 7:
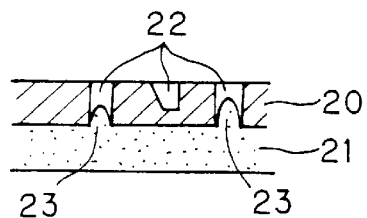
FIG. 7 is a sectional view illustrating a fundamental layer structure of a packaging film for forming the first and second tearable zones of the packaging bag of the present invention.

Each of the above-described first and second tearable rough surface portions has a fundamental film layer structure, which can be obtained by forming, with the use of for example a sandpaper roller, fine perforations 22, 22 . . . 22 on an oriented plastic film such as a biaxial oriented polypropylene layer 20 for forming the outermost layer of the packaging bag, and then covering these perforations 22, 22 . . . 22 with a non-oriented plastic film such as a non-oriented polyethylene layer, as shown in FIG. 7. When an extrusion lamination method is applied, the non-oriented plastic partially enters the perforations 22, 22 . . . 22 to form sealing plug portions 23, 23 . . . 23, thus maintaining the excellent gas-barrier property. When a dry lamination method is applied, adhesive enters the perforations 22, 22 . . . 22 so as to improve the gas-barrier property.

Figure 8:
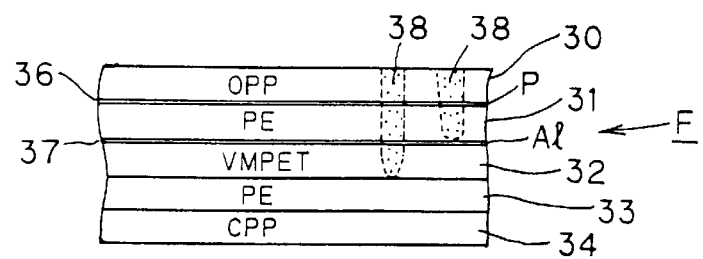
FIG. 8 is a sectional view illustrating a concrete layer structure of the packaging film for forming the first and second tearable zones of the packaging bag of the present invention.

In a practical manner, a lamination is used as a strip film for forming the packaging bag, as shown in FIG. 8. More specifically, a biaxial oriented polypropylene (OPP) layer 30 serving as the outermost layer of the packaging bag is provided on its inner surface with a printing layer 36. A biaxial oriented polyester (VMPET) layer 32 is formed on the inner surface of the printing layer 36 through a low density polyethylene (PE) layer 31. The biaxial oriented polyester layer 32 has on its upper surface an aluminum layer 37 deposited thereon. The perforations 38, 38 . . . 38 are formed on each of these three layers 30, 31, 32. There may exist a plurality of fine recesses on these three layers 30, 31, 32 together with the above-mentioned perforations 38, 38 . . . 38. The formation process of perforations 38, 38 . . . 38 is carried out independently for each of these layers 30, 31, 32 in order to prevent the polyethylene layer 30 from being broken. After the completion of the formation of perforations 38, 38 . . . 38, these three layers 30, 31, 32 are subjected to a lamination process, while making registration of them. Then, a non-oriented polypropylene (CPP) layer 34 is formed on the inner surface of the biaxial oriented polyester layer 32 through a low-density polypropylene (PE) layer 33.

When the perforations are formed in the oriented film serving as the outermost layer of the packaging bag and these perforations are covered with the non-oriented film in this manner, it is possible to form the tearable rough surface portion having an excellent gas barrier property so as to permit to apply the tearable rough surface portion to the packaging bag, which is to be filled with gas such as nitrogen gas to carry out a smooth opening of the packaging bag.

Figure 9:
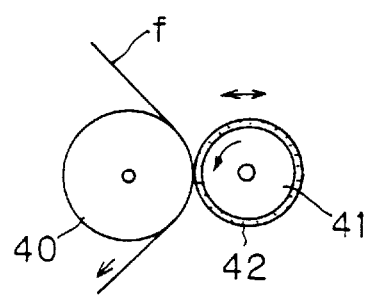
FIG. 9 is a schematic descriptive view illustrating an apparatus for forming the first and second tearable zones on the packaging film.
Figure 10:
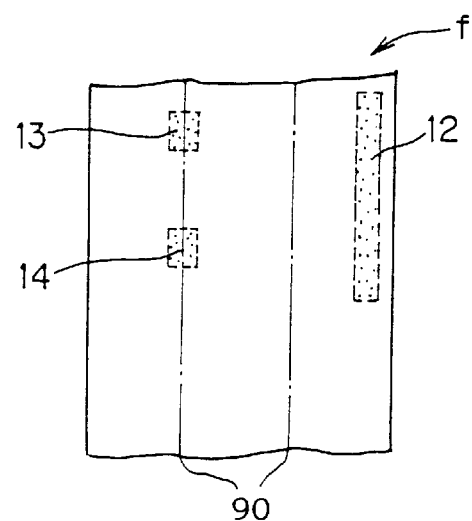
FIG. 10 is a plan view illustrating a strip film obtained by forming the first and second tearable zones on the packaging film.

With respect to an apparatus for forming the perforations in the film "f", the film is traveled by means of a driving roller 40 as shown in FIG. 9. A sand roller 41 provided on its peripheral surface with sheets of sandpaper for forming the first and second tearable rough surface portions. The sand roller 41 is movable between an operating position in which the sand roller 41 is pressed against the driving roller 40 and a non-operating position in which the former 41 is apart from the latter 40. More specifically, the sand roller 41 is selectively located in one of the operation and non-operation positions for each of a prescribed travelling distance of the film caused by the driving roller 40. According to such an apparatus, it is possible to form the first tearable rough surface portions 13, 14 on the crease portion and the second tearable rough surface portion 12 on a longitudinal edge portion for forming the longitudinal sealed portion, respectively. The sheets of sandpaper preferably have a grain size within the range of from #50 to #200, and more preferably a grain size of about #80.

When the tearable rough surface portion is not formed on the entire longitudinal length, but is formed partially in the above-described embodiment of the present invention, it is possible to carry out a smooth opening of the packaging bag, while ensuring a high gas-barrier property. Incidentally, the tearable rough surface portion may be formed on the entire longitudinal length of the packaging bag. In this case, there requires no control of movement of the sand roller, leading to an easy operation. Such a tearable rough surface portion formed on the entire longitudinal length of the packaging bag may have marks, which indicate the tearing position and direction for a user.

In the above-described embodiment of the present invention, the packaging bag has two marks indicating the tearing position and direction for the user for each of the first and second tearable zones. The packaging bag may have three or more marks for each of these zones.

According to the packaging bag of the present invention as described in detail, it is possible to ensure an excellent gas-barrier property and to cut away a portion becoming useless from the packaging bag according as the contents received therein decreases so that they can easily be picked therefrom without bring a hand into contact with oil adhered on the inner surface of the packaging bag to make the hand unclean. The packaging bag can smoothly be torn in its lateral direction at different longitudinal positions, and the contents received in the packaging bag can therefore easily be picked therefrom even when the level of the contents reaches the vicinity of the bottom of the packaging bag.

What is claimed is:

1. A packaging bag, which comprises a tubular body obtained by joining opposite ends of a strip film comprising a lamination of at least one oriented film and at least one non-oriented film to each other so as to form a longitudinal sealed portion, said tubular body having at opposite sides in a diametrical direction thereof crease portions, respectively, and said tubular body having at opposite edges in a longitudinal direction thereof lateral sealed portions, respectively, and at least one of said crease portions having a first tearable zone in which said oriented film has perforations, which are covered with said non-oriented film, said first tearable zone capable of being torn at longitudinal different positions, and said longitudinal sealed portion being located on a back surface side of said packaging bag, the improvement wherein:

said longitudinal sealed portion has a second tearable zone in which said oriented film has perforations that are covered with said non-oriented film, said second tearable zone being capable of being torn at longitudinal different positions;

said second tearable zone has a length in a longitudinal direction of said packaging bag, which length is identical to or longer than that of said first tearable zone; and an upper edge of said second tearable zone is located in a same level as or above an upper edge of said first tearable zone and a lower edge of said second tearable zone is located in a same level as or below a lower edge of said first tearable zone.

2. The packaging bag as claimed in claim 1, wherein:

said first tearable zone includes a plurality of first tearable rough surface portions spaced apart from each other;

said second tearable zone includes a plurality of second tearable rough surface portions spaced apart from each other so as to correspond to said plurality of first tearable rough surface portions, respectively; and an upper edge of each of said plurality of second tearable rough surface portions is located in a same level as or above an upper edge of a corresponding one of said plurality of first tearable rough surface portions and a lower edge of each of said plurality of second tearable rough surface portions is located in a same level as or below a lower edge of a corresponding one of said plurality of first tearable rough surface portions.

3. The packaging bag as claimed in claim 1, wherein:

said first tearable zone includes a plurality of first tearable rough surface portions spaced apart from each other;

said second tearable zone includes a single second tearable rough surface portions; and an upper edge of said single second tearable rough surface portion is located in a same level as or above an upper edge of an uppermost one of said plurality of first tearable rough surface portions and a lower edge of said single second tearable rough surface portion is located in a same level as or below a lower edge of a lowermost one of said plurality of first tearable rough surface portions.

4. The packaging bag as claimed in claim 1, wherein:

said first tearable zone has at least one mark indicating a tearing direction.

5. The packaging bag as claimed in claim 1, wherein:

said perforations in said oriented film are formed by means of a sheet of sandpaper.

6. The packaging bag as claimed in claim 1, wherein:

said packaging bag is formed in a shape of a pillow so that said longitudinal sealed portion has a folded portion extending therealong, said folded portion having a longitudinal edge opposing against a tearing direction in said first tearable zone; and said second tearable zone is formed on said folded portion.

7. The packaging bag as claimed in claim 1, wherein:

said packaging bag is formed in a shape of an envelope so that said opposite ends of said strip film forming said longitudinal sealed portion face in opposite directions to each other, one of said opposite ends of said strip film having a longitudinal edge opposing against a tearing direction in said first tearable zone; and said second tearable zone is formed on said one of said opposite ends of said strip film.

8. The packaging bag as claimed in claim 1, wherein:

said first tearable zone and said second tearable zone are formed over an entire longitudinal length of said packaging bag.

* * * * *